US008955062B2

(12) United States Patent
Fullerton (10) Patent No.: US 8,955,062 B2
(45) Date of Patent: *Feb. 10, 2015

(54) METHOD AND SYSTEM FOR PERMITTING ACCESS TO RESOURCES BASED ON INSTRUCTIONS OF A CODE TAGGED WITH AN IDENTIFIER ASSIGNED TO A DOMAIN (71) Applicant: Marvell World Trade Ltd., St. Michael (BB)

(72) Inventor: Mark N. Fullerton, Austin, TX (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/215,148

(22) Filed: Mar. 17, 2014

(65) Prior Publication Data
US 2014/0201822 A1 Jul. 17, 2014

Related U.S. Application Data (63) Continuation of application No. 12/026,840, filed on Feb. 6, 2008, now Pat. No. 8,677,457.

(60) Provisional application No. 60/889,086, filed on Feb. 9, 2007.

(51) Int. Cl.
G06F 15/16 (2006.01)
G06F 17/30 (2006.01)
(Continued)

(52) U.S. Cl.
CPC .............. H04L 63/10 (2013.01); G06F 21/53 (2013.01); G06F 21/54 (2013.01); G06F 21/74 (2013.01)
USPC ............... 726/4; 380/247; 380/248; 709/225; 713/155; 713/156

(58) Field of Classification Search
USPC .......... 713/168–174, 182–186, 202; 709/225, 709/229; 726/2–8
See application file for complete search history.

(56) References Cited

U.S. PATENT DOCUMENTS 3,858,182 A 12/1974 Delagi et al.
5,280,614 A 1/1994 Munroe et al.
(Continued)

FOREIGN PATENT DOCUMENTS

EP 1331539 7/2003
WO WO/03/090052 10/2003

OTHER PUBLICATIONS

Notification of Transmittal of the International Search Report and The Written Opinion of The International Searching Authority, or the Declaration dated Jul. 18, 2008 in reference to PCT/US2008/001668.

(Continued)

Primary Examiner — Evans Desrosiers (57) ABSTRACT

A method including: assigning identifiers to respective domains, where each of the domains is allocated a corresponding set of resources, and where the resources in the sets of resources are accessible at respective physical addresses; storing permissions to access the physical addresses, where each of the permissions indicates which of the physical addresses one or more of the domains are permitted to access. The method also includes: assigning a code to a first domain, where the code includes instructions, and where each of the instructions includes a corresponding one of the physical addresses; tagging each of the instructions by adding the identifier assigned to the first domain to each of the instructions; and during execution of each of the instructions, comparing the identifier included in the corresponding instruction to one of the permissions; and based on the comparison, permitting access to the set of resources allocated to the first domain.

20 Claims, 4 Drawing Sheets (51) Int. Cl.
*G06F 21/53* (2013.01)
*G06F 21/54* (2013.01)
*G06F 21/74* (2013.01)
*H04L 29/06* (2006.01)
*G06F 15/173* (2006.01)
*H04K 1/00* (2006.01)

(56) References Cited

U.S. PATENT DOCUMENTS

2002/0161887 A1* 10/2002 Foster et al. ............... 709/225
2005/0172138 A1   8/2005 Ezzat
2005/0188173 A1   8/2005 Hasbun et al.
2006/0288130 A1  12/2006 Madukkarumukumana et al.

OTHER PUBLICATIONS

Intel Corporation: "Intel Architecture Software Developer's Manual vol. 3: System Programming" 1999, XP002486470; Chapter 6; pp. 6-1 through 6-20.
Intel Corporation "Intel Architecture Software Developer's Manual vol. 1: Basic Architecture" 1999, XP002486471; Chapter 10; pp. 10-1 through 10-7.
Wahbe, Robert et al. "Efficent Software Based Fault Isolation". ACM SIGOPS Operating Systems Review. vol. 27. No. 5. ACM, 1994.
Fraser, Keir, et al. "Reconstructing I/O." Technical Report. University of Cambridge, Computer Laboratory (2004).

* cited by examiner

METHOD AND SYSTEM FOR PERMITTING ACCESS TO RESOURCES BASED ON INSTRUCTIONS OF A CODE TAGGED WITH AN IDENTIFIER ASSIGNED TO A DOMAIN

CROSS-REFERENCE TO RELATED APPLICATIONS

The present disclosure is a continuation of U.S. patent application Ser. No. 12/026,840 (now U.S. Pat. No. 8,677, 457), filed on Feb. 6, 2008. This application claims the benefit of U.S. Provisional Application No. 60/889,086 filed on Feb. 9, 2007. The entire disclosures of the applications referenced above are incorporated herein by reference.

BACKGROUND

Many consumer products, such as mobile phones, set top boxes, personal digital assistants (PDA), and other systems running an operating system, are implemented with one or more processor cores. To secure a piece of code on the system, the processes that can access the code must be controlled. One approach is to partition a core into a trusted zone and a non-trusted zone. Code in the trusted zone can access all of the system resources. Code in the non-trusted zone has limited access to the system resources, as managed by code in the trusted zone. Two separate pieces of code in the non-trusted zone have the same level of permissions for access to the resources. However, it may be desirable to prevent access between the codes in the non-trusted zone. For example, an electronic wallet application and a digital rights management application may both run in the non-trusted zone. To maintain the integrity of each piece of code, access by the other needs to be controlled or prevented. A common approach is to run each piece of code in different cores. This approach, however, requires extra hardware.

Further, system resource access permissions are typically defined based on the virtual address space for the resources. Once permission for a piece of code is verified, the virtual address is translated to the physical address via a look-up table (LUT). However, this security mechanism is software based and may be bypassed or corrupted by a variety of means, including the direct use of the physical address of a resource directly, hence bypassing the virtual address translation. Thus, it may be difficult to prove the level of security provided by software based mechanisms.

Accordingly, it would be desirable to provide a method and system for providing security for codes running in non-trusted domains in a processor core.

BRIEF SUMMARY OF THE INVENTION

A method and apparatus of the invention provide security within a processor core by configuring a trusted domain and a plurality of isolated domains. Each isolated domain is assigned a unique domain identifier. One or more resources are associated with each of the isolated domains. The associations are stored as permissions to access the physical addresses of the resources. A code to be executed by a hardware device is assigned to one of the isolated domains, and the unique domain identifier for the assigned isolated domain is written to the hardware device. When the hardware device executes the code, each instruction is logically tagged with the domain identifier written to the hardware device. The instruction is identifiable as a request to access a physical address of a resource. The hardware device compares the domain identifier of the instruction with the permissions of the physical address in the instruction. If the domain identifier of the instruction has permission to access this physical address, then access to the resource at the physical address is allowed. Access to the resource is otherwise blocked. In this manner, codes assigned to different isolated domains can run independently within the same processor core without interference from each other. Further, since the permissions are configured based on the physical addresses of the resources, concerns related to software-based security mechanisms are not relevant.

DETAILED DESCRIPTION

Embodiments of the invention relates to a method and apparatus for providing security for codes running in non-trusted domains of a processor core. The following description is presented to enable one of ordinary skill in the art to make and use the invention and is provided in the context of a patent application and its requirements. Various modifications to the embodiments and the generic principles and features described herein will be readily apparent to those skilled in the art. Thus, the invention is not intended to be limited to the embodiments shown, but is to be accorded the widest scope consistent with the principles and features described herein.

The invention will be described in the context of particular methods having certain steps. However, the method operates effectively for other methods having different and/or additional steps not inconsistent with the invention.

Figure 1:
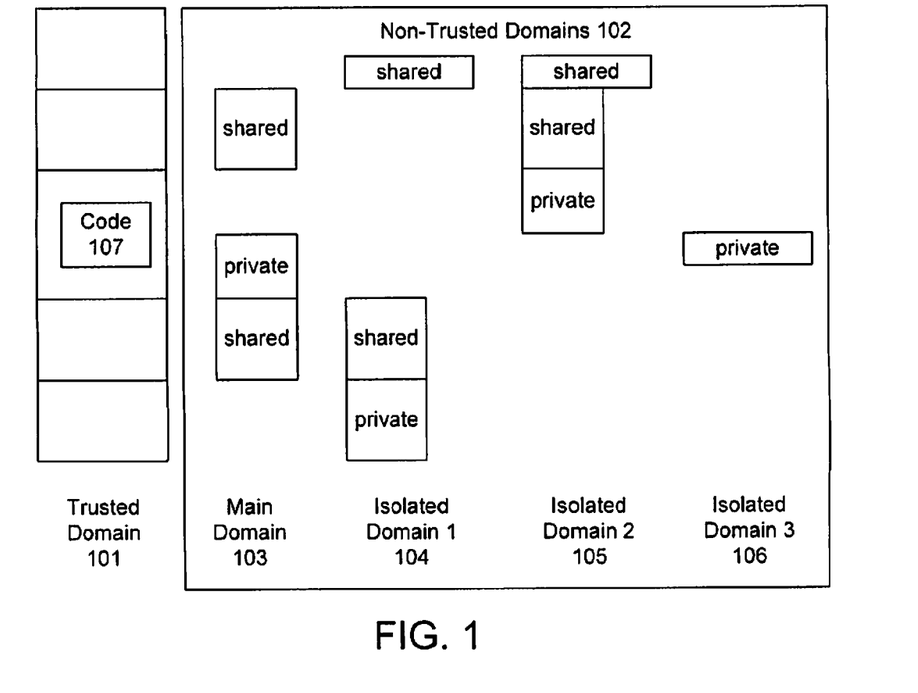
FIG. 1 illustrates an exemplary embodiment of multiple isolated domains in a processor core.

FIG. 1 illustrates an exemplary embodiment of multiple isolated domains in a processor core. As illustrated in FIG. 1, a processor core may be logically partitioned into a plurality of domains. The processor core is described in more detail below with reference to FIG. 2. A "domain", as used in this specification, is a set of system resources (such as peripherals, memory space, etc.) which exist as a group. Any or all of these resources may be shared or private. Resources are private if they are accessible only to one domain. Resources are shared if they are accessible to more than one domain. Resources are accessible at their physical addresses.

The domains may include a trusted domain 101 and a plurality of non-trusted domains 102. The non-trusted domains 102 may include a main domain 103 and a plurality of isolated domains 104-106. A "trusted domain" is a domain which is privileged and able to configure other domains. A trusted domain 101 is able to access the resources of the processor core allocated to the trusted domain and the non-trusted domains. The trusted domain 101 includes code 107 for configuring the non-trusted domains 103-106 and for managing communications between codes in the non-trusted domains 103-106.

The "main domain" 103 is a primary non-trusted domain in the processor core. The operating system may be run in the main domain 103. Code in the main domain 103 is not able to access resources which are private to the trusted domain 101 or any of the isolated domains 104-106, but is able to access the shared resources. The "isolated domains" 104-106 are non-trusted domains that have at least some private resources. There may be multiple such isolated domains 104-106, each with its own resources. The isolated domains 104-106 are only able to access their own private and shared resources, as described below. Each of the non-trusted domains 102 is assigned a unique domain identifier.

Figure 2:
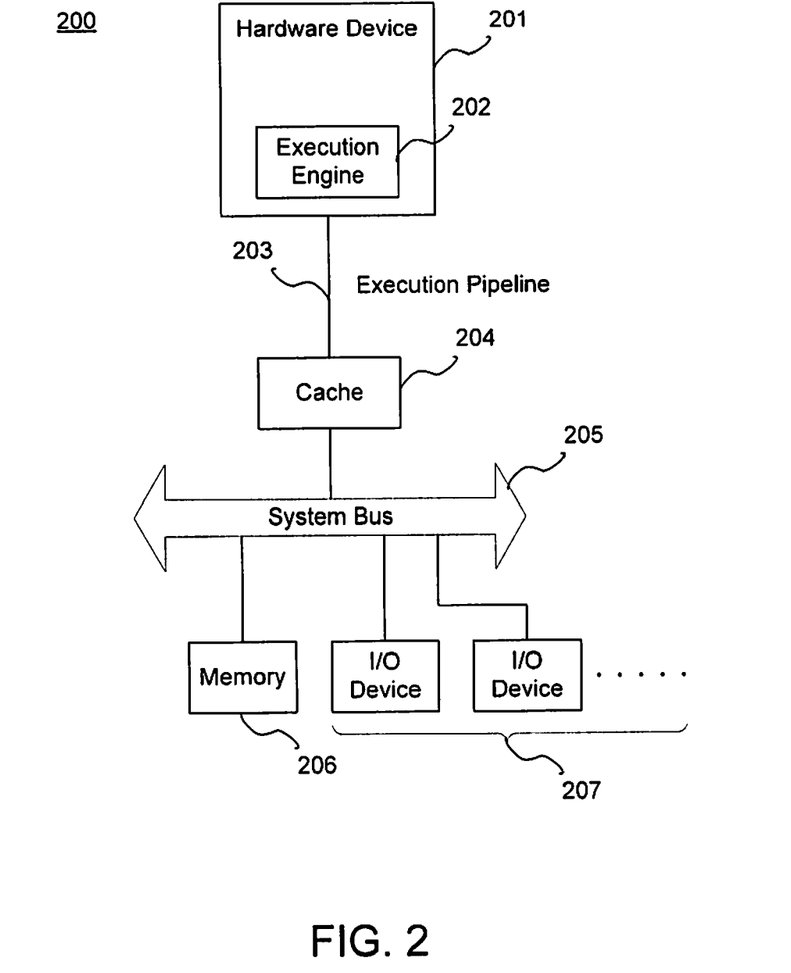
FIG. 2 is a block diagram of a processor core architecture in which embodiments of the invention may be implemented.

FIG. 2 is a block diagram of a processor core in which the invention may be implemented. The core 200 includes a hardware device 201 with an execution engine 202 for executing code. The hardware device 201 can be of any type, such as a processor, a memory controller, a universal asynchronous receiver/transmitter (UART) device, etc. When the execution engine 202 executes code, the instructions are placed in an execution pipeline 203. One or more caches 204 can be used to manage the execution of the instructions. The hardware device 201 and the cache 204 are coupled to a system bus 205. Coupled to the system bus 205 are resources, which can include memory 206 and one or more I/O devices 207. The hardware device 201 can access the resources 206-207 at their respective physical addresses.

Figure 3:
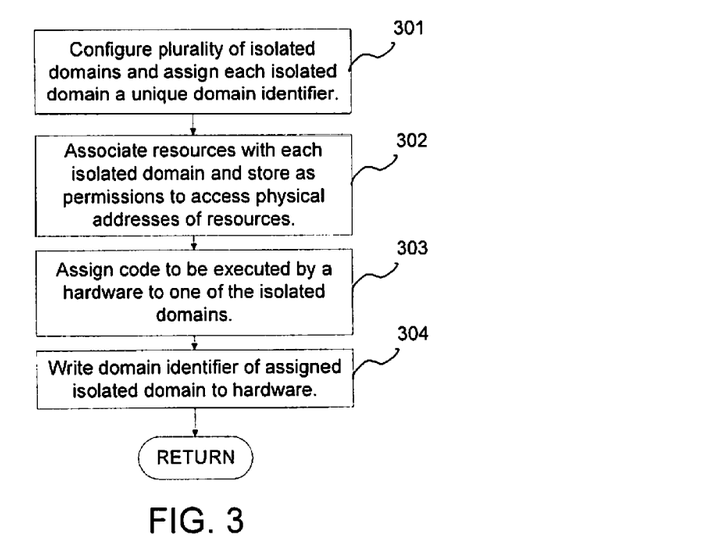
FIG. 3 is a flowchart illustrating an exemplary embodiment of the creation of isolated domains in a processor core.

FIG. 3 is a flowchart illustrating an exemplary embodiment of the creation of isolated domains in a processor core. Referring to both FIGS. 2 and 3, when the core 200 is booted, code 107 in the trusted domain 101 configures a plurality of isolated domains 104-106. Each isolated domain is assigned a unique domain identifier (step 301). One or more resources 206-207 are associated with each isolated domain. The associations are stored as permissions to access the physical addresses of the resources 206-207 (step 302). When a hardware device 201 is configured, the code to be executed by the hardware device 201 is assigned to one of the isolated domains 104-106 (step 303). The domain identifier for the assigned isolated domain is then written to the hardware device 201 (step 304).

Figure 4:
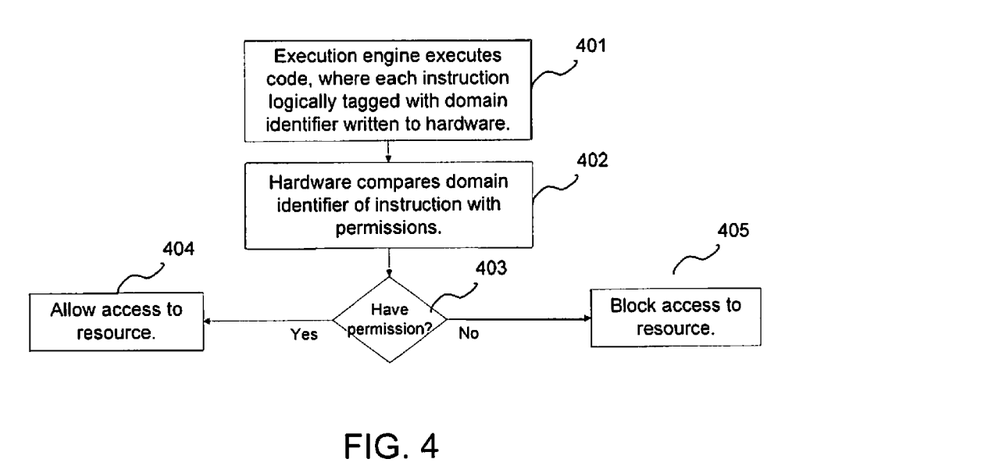
FIG. 4 is a flowchart illustrating an exemplary embodiment of the use of the domain identifier.

FIG. 4 is a flowchart illustrating an exemplary embodiment of the use of the domain identifier. When the execution engine 202 executes code in an isolated domain, each instruction is logically tagged with the domain identifier of the isolated domain written to the hardware device 201 (step 401). Logically, the domain identifier is being associated with each instruction in the execution pipeline 204, and the operations associated with this instruction have the associated domain identifier. In the exemplary embodiment, the domain identifier comprises additional bits sent on the system bus 205 along with the instruction.

During execution of the code, the hardware device 201 compares the domain identifier of the instruction with the permissions for the resources 206-207 (step 402). The instruction is identifiable as a request for access to a physical address of a resource. Thus, the hardware device 201 compares the permissions of the physical address in the instruction with the domain identifier of the instruction (step 403). If the domain identifier of the instruction has permission to access the physical address, then access to the resource at the physical address is allowed (step 404). Otherwise, access is blocked (step 405), and a "memory out of range" error is returned. The hardware device 201 can use the assigned domain identifier to check the permissions each time a resource access is attempted or at any time during the execution of the code.

For example, assume that processor core 200 includes resources, RESOURCE1 and RESOURCE2 with physical addresses ADD1 and ADD2. During configuration of the core 200, two isolated domains, DOMAIN1 and DOMAIN2 are configured and assigned unique domain identifiers (step 301). Both RESOURCE1 and RESOURCE2 are associated with DOMAIN1, while only RESOURCE1 is associated with DOMAIN2. The permissions for ADD1 are stored as giving access to DOMAIN1 and DOMAIN2, and the permissions for ADD2 are stored as giving access to DOMAIN1 (step 302).

Assume that two applications, APP1 and APP2 are configured to run on PROCESSOR1 and PROCESSOR2, respectively. During the configuration of the applications, APP1 is assigned to DOMAIN1, and APP2 is assigned to DOMAIN2 (step 303). DOMAIN1 is then written to PROCESSOR1, and DOMAIN2 is written to PROCESSOR2 (step 304).

When PROCESSOR1 executes APP1, each instruction is logically tagged with DOMAIN1 (step 401). Assume that a first instruction of APP1 includes a request to access ADD1. PROCESSOR1 checks the permissions of ADD1 and determines that DOMAIN1 has been given access (steps 402-403). The first instruction is thus allowed access to the resource at ADD1 (step 404). Assume that a second instruction of APP1 includes a request to access ADD2. PROCESSOR1 checks the permissions of ADD2 and determines that DOMAIN1 has been given access (steps 402-403). The second instruction is thus allowed to access the resource at ADD2 (step 404).

When PROCESSOR2 executes APP2, each instruction is logically tagged with DOMAIN2 (step 401). Assume that a first instruction of APP2 includes a request to access ADD1. PROCESSOR2 checks the permissions of ADD1 and determines that DOMAIN2 has been given access (steps 402-403). The first instruction is thus allowed access to the resource at ADD1 (step 404). Assume that a second instruction of APP2 includes a request to access ADD2. PROCESSOR2 checks the permissions of ADD2 and determines that DOMAIN2 has not been given access (steps 402-403). The second instruction is thus blocked from accessing the resource at ADD2 (step 405). A "memory out of range" message is returned.

In this manner, APP1 and APP2 execute in separate isolated domains and each are only able to access their own private or shared resources. Neither is able to access resources which are private to the trusted domain 101 or any of the other non-trusted domains. Neither APP1 nor APP2 need to be modified. If APP1 and APP2 is required to communicate, this communication is managed through the code 107 in the trusted domain 101.

Occasionally, the checking of the domain identifier cannot be performed in real time, such as for asynchronous events. Accesses from asynchronous events may not be related to the current isolated domain executing at an execution engine. The asynchronous event can be either from an external change, e.g., an interrupt, or from an action which took place some time previous, e.g. DMA completion at which time there was a different current domain. An isolated domain in which the event should be handled is the target isolated domain, which is identified by the domain identifier tagged on the asynchronous event. The target isolated domain can be the current isolated domain or a isolated domain different from the current isolated domain.

Figure 5:
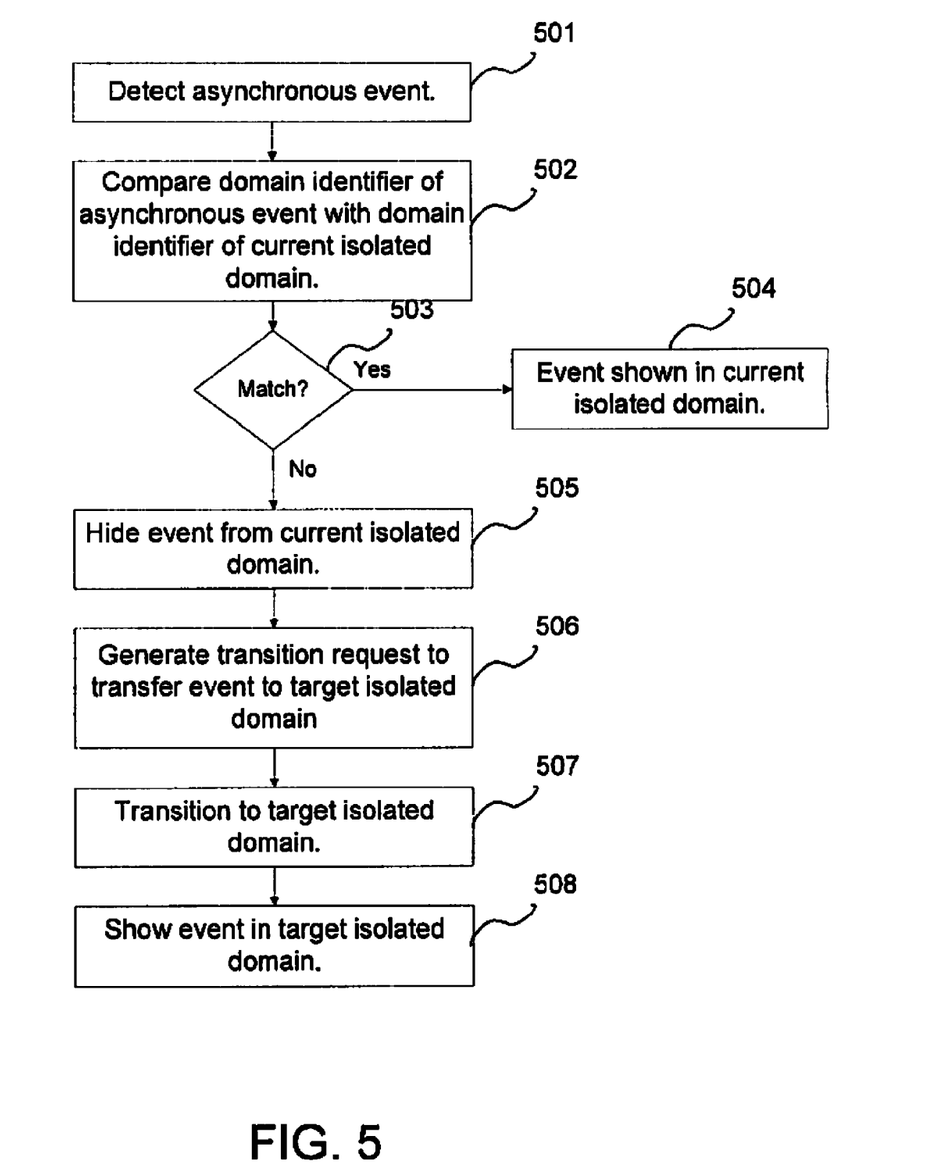
FIG. 5 is a flowchart illustrating an exemplary embodiment of the use of the domain identifier for asynchronous events.

FIG. 5 is a flowchart illustrating an exemplary embodiment of the use of the domain identifier for asynchronous events. When a hardware device 201 detects an asynchronous event (step 501), the hardware device 201 compares the domain identifier of the event with the domain identifier of the current isolated domain executing on an execution engine 202 (step 502). If they match (step 503), then the event is allowed to occur in the current isolated domain (step 504). If they do not match, then the event is hidden in the current isolated domain (step 505). The hardware device 201 then generates a transition request to the trusted domain 101 to transfer the asynchronous event to the target isolated domain (step 506). Code in the trusted domain 101 transitions the execution engine 202 to the target isolated domain (step 507). The event is then shown in the target isolated domain (step 508), in which the event is handled. The hardware device 201 compares the permissions of the physical addresses of the resources 206-207 with the domain identifier of the event to determine which resources the event can access, as described above with reference to FIG. 4.

In the exemplary embodiment, the transition to the target isolated domain comprises a series of operations carried out between two instructions with different domain identifiers on the same execution engine or set of engines. The transition code can be implemented in any one of a number of ways. For example, clean up code is run in the current isolated domain, followed by a run of set up code in the target isolated domain. The clean up code hides the current isolated domain's resources. Once the transition to the target isolated domain occurs, the set up code enables the target isolated domain's resources. For another example, a single code is run in the trusted domain 101 to disable the resources of the current isolated domain and to enable the resources of the target isolated domain.

In the exemplary embodiment, the transition code contains no operational code. The transition code only performs the transition from a current isolated domain to a target isolated domain. The operation of any instruction is then handled in the target isolated domain, not by the transition code.

For example, assume that a UART interrupt is configured to be taken in one isolated domain, DOMAIN1. Assume also that another isolated domain, DOMAIN2, is currently running on the execution engine 202. When the hardware device 201 detects the interrupt event (step 501), the hardware device 201 compares the domain identifier of the interrupt event, DOMAIN1, with the domain identifier of the currently running isolated domain, DOMAIN2 (step 502). Since they do not match (step 503), the interrupt event is hidden in DOMAIN2 (step 505). The hardware device 201 generates a transition request to the trusted domain 101 to transfer the interrupt event to DOMAIN1 (step 506). Code in the trusted domain 101 transitions the execution engine 202 from DOMAIN2 to DOMAIN1 (step 507). The interrupt event is then shown in DOMAIN1, which is then handled by the execution engine 202 (step 508). The hardware device 201 determines the permissions to access the physical addresses of the resources 206-207, as described above with reference to FIG. 4.

In some cases, it may be more expedient to place a resource "above" the point where the domain identifier tag is added to an instruction. For example, an initial design may wish to execute all instructions at the system-on-chip (SOC) level, thus avoiding modification of the core 200. Examples of such resources include caches and memory management unit/translation lookaside buffer (MMU/TLB), typically used in virtual address translation. If the execution engine 202 is executing one piece of code at a time, a register can be associated with the hardware device 201 for storing the domain identifier assigned to the code. The value in the register is logically attached to a group of instructions executed by the execution engine 202, rather that tagging each individual instruction. When the execution engine 202 transitions to a different isolated domain, the value in the register is changed to the domain identifier of that isolated domain.

If one or more of the caches in the processor core 200 are above the level where the domain identifier is added to an instruction, then when the execution engine 202 transitions to a different isolated domain, the cache is flushed of content belonging to the previously executing isolated domain. Flushing of the cache is required since access to the cache is not checked at this level. The flushing may be implemented in any number of ways, for example: defining only one isolated domain as cacheable; tagging cache contents to indicate which isolated domain the content belongs to, and the cache is selectively flushed for contents of a particular isolated domain; or completely flushing the cache.

Similar to the cache, the MMU/TLB can exist above the point where the domain identifier is added to an instruction. Direct modification to the MMU/TLB would be a secure operation and the address tables should either be secure or in the correct domain. As the domain identifier is used to determine permissions based on physical addresses rather than virtual addresses, there is no security breach if a TLB is "corrupted" to point to an undesirable address.

Although the exemplary embodiment is described above as a mechanism for securing access between codes in non-trusted domains for a processor core, the concept of multiple domains can be expanded to be an identifier for a task within the overall system. For example, the task may be to allocate bus bandwidth or processing time. This is normally done at the operating system level, but in this alternative embodiment, domains are used where there is more than one operating system running on the system. For example, a single digital signal processor (DSP) is used to perform multiple tasks, such as processing of multimedia and modem functions. Each task is assigned a different operating system or real-time operating system (RTOS), and is not allowed to occupy more than its allotted space on the system. Domains can be used at all levels of the system, such as allowing different fractions of a shared cache to be allocated to different tasks, different amount of bus bandwidth, etc. The domain identifier can also be used for prioritization of the tasks with the system.

A method and apparatus for providing security for codes running in non-trusted domains in a processor core have been disclosed. The method and apparatus configure a processor core to include a trusted domain and a plurality of isolated domains. Each of the isolated domains is assigned a unique domain identifier. One or more resources are associated with each of the isolated domains. The associations are stored as permissions to access the physical addresses of the resources. A code to be executed by a hardware device is associated with one of the isolated domains, and the unique domain identifier for the assigned isolated domain is written to the hardware device. When the hardware device executes the code, each instruction is logically tagged with the domain identifier written to the hardware device. The instruction is identifiable as a request to access a physical address of a resource. The hardware device compares the domain identifier of the instruction with the permissions of the physical address in the instruction. If the domain identifier of the instruction has permission to access this physical address, then access to the resource at the physical address is allowed. Access to the resource is otherwise blocked. In this manner, codes assigned to different isolated domains can run independently within the same processor core without interference from each other. Further, since the permissions are configured based on the physical addresses of the resources, concerns related to software-based security mechanisms are not relevant.

The invention has been described in accordance with the embodiments shown, and one of ordinary skill in the art will readily recognize that there could be variations to the embodiments, and any variations would be within the spirit and scope of the invention. For example, the invention can be implemented using hardware, software, a computer readable medium containing program instructions, or a combination thereof. Software written according to the invention is to be either stored in some form of computer-readable medium such as memory CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A method comprising:
assigning a plurality of identifiers respectively to a plurality of domains, wherein each of the plurality of domains is allocated a corresponding set of resources selected from a plurality of resources, and wherein the plurality of resources are accessible at respective physical addresses;
storing a plurality of permissions to access the physical addresses, wherein each of the plurality of permissions indicates which of the physical addresses one or more of the plurality of domains are permitted to access;
assigning a code to a first domain, wherein the plurality of domains includes the first domain, wherein the code is to be executed by a processor, wherein the code comprises instructions, and wherein each of the instructions comprises a corresponding one of the physical addresses;
tagging each of the instructions in the code by adding the identifier assigned to the first domain to each of the instructions; and
during execution of each of the instructions by the processor,
comparing (i) the identifier of the first domain included in the corresponding instruction to (ii) one or more of the plurality of permissions; and
based on the comparison, permitting access to the set of resources allocated to the first domain.

2. The method of claim 1, wherein the identifier assigned to the first domain comprises a plurality of bits.

3. The method of claim 1, wherein the tagging of each of the instructions in the code is performed during execution of the code by the processor.

4. The method of claim 1, wherein each of the plurality of permissions is assigned to a corresponding one of the plurality of domains.

5. The method of claim 1, wherein:
the first domain is allocated one or more resources allocated to a second domain;
the plurality of domains include the second domain; and
the second domain is allocated resources not allocated to the first domain.

6. The method of claim 1, wherein:
the first domain is allocated a same one or more resources as a second domain; and
the plurality of domains includes the second domain.

7. The method of claim 1, wherein:
a second code is assigned to a second domain;
the plurality of domains include the second domain;
the second domain is assigned a second identifier different than the identifier of the first domain; and
the first domain and the second domain share one of the plurality of resources.

8. The method of claim 1, further comprising receiving, at the processor and via a system bus located between the processor and the plurality of resources, the identifier of the first domain and the instructions of the code, wherein:

the plurality of resources comprise (i) a memory, and (ii) input and output devices;
the memory and the input and output devices are directly connected to the system bus;
each of the physical addresses in the instructions of the code identifies one of the memory and the input and output devices; and
the processor communicates with the plurality of resources via the system bus.

9. The method of claim 1, further comprising:
executing the code in the first domain via the processor;
detecting, via the processor, an asynchronous event, wherein the asynchronous event is tagged with a second identifier;
comparing the second identifier of the asynchronous event with the identifier of the first domain; and
in response to the second identifier not matching the identifier of the first domain,
hiding the asynchronous event from the first domain,
generating a transition request to transfer the processor from the first domain to a second domain, wherein the second domain corresponding to the second identifier of the asynchronous event, and
subsequent to transitioning the processor to the second domain, showing the asynchronous event in the second domain.

10. The method of claim 9, further comprising, in response to the second identifier of the asynchronous event not matching the identifier of the first domain, transitioning to the second domain via the processor, wherein the transitioning to the second domain comprises:
running code in the first domain to hide or disable resources corresponding to the first domain; and
running code in the second domain to enable resources corresponding to the second domain.

11. A system comprising:
a processor configured to access a plurality of resources, wherein the plurality of resources are accessible at respective physical addresses, wherein the processor has a plurality of domains, wherein each of the plurality of domains is allocated a corresponding set of resources selected from the plurality of resources, and wherein the plurality of domains are assigned respectively a plurality of identifiers; and
a memory connected to the processor, wherein the memory is configured to store a plurality of permissions to access the physical addresses, wherein each of the plurality of permissions indicates which of the physical addresses one or more of the plurality of domains are permitted to access, wherein the processor is configured to
execute code, wherein the code is assigned to a first domain of the plurality of domains, wherein the code comprises instructions, and wherein each of the instructions comprises a corresponding one of the physical addresses and is tagged with the identifier assigned to the first domain, and
during execution of each of the instructions,
compare (i) the identifier of the first domain included in the corresponding instruction to (ii) one or more of the plurality of permissions, and
based on the comparison, permit access to the set of resources allocated to the first domain.

12. The system of claim 11, wherein the identifier assigned to the first domain comprises a plurality of bits.

13. The system of claim 11, wherein the processor is configured to, during the execution of the code, tag each of the instructions in the code by adding the identifier assigned to the first domain to each of the instructions.

14. The system of claim 11, wherein each of the plurality of permissions is assigned to a corresponding one of the plurality of domains.

15. The system of claim 11, wherein:
the first domain is allocated one or more resources allocated to a second domain;
the plurality of domains includes the second domain; and
the second domain is allocated resources not allocated to the first domain.

16. The system of claim 11, wherein:
the first domain is allocated a same one or more resources as a second domain; and
the plurality of domains includes the second domain.

17. The system of claim 11, wherein:
a second code is assigned to a second domain;
the plurality of domains include the second domain;
the second domain is assigned a second identifier different than the identifier of the first domain; and
the first domain and the second domain share one of the plurality of resources.

18. The system of claim 11, further comprising receiving, via a system bus located between the processor and the plurality of resources, the identifier of the first domain and the instructions of the code at the processor, wherein:
the plurality of resources comprise (i) a second memory, and (ii) input and output devices;
the second memory and the input and output devices are directly connected to the system bus;
each of the physical addresses in the instructions of the code identifies one of the second memory and the input and output devices; and
the processor communicates with the plurality of resources via the system bus.

19. The system of claim 11, further comprising a device, wherein:
the processor is configured to execute the code in the first domain; and
the device is configured to
detect an asynchronous event, wherein the asynchronous event is tagged with a second identifier,
compare the second identifier of the asynchronous event with the identifier of the first domain, and
in response to the second identifier not matching the identifier of the first domain,
hide the asynchronous event from the first domain,
generate a transition request to transfer the processor from the first domain to a second domain, wherein the second domain corresponding to the second identifier of the asynchronous event, and
subsequent to transitioning the processor to the second domain, showing the asynchronous event in the second domain.

20. The system of claim 19, wherein the processor is configured to, in response to the second identifier of the asynchronous event not matching the identifier of the first domain, transition to the second domain including:
running code in the first domain to hide or disable resources corresponding to the first domain; and
running code in the second domain to enable resources corresponding to the second domain.

* * * * *